United States Patent
Huxham et al.

(10) Patent No.: US 9,648,013 B2
(45) Date of Patent: May 9, 2017

(54) SYSTEMS, METHODS AND DEVICES FOR PERFORMING PASSCODE AUTHENTICATION

(71) Applicant: Visa International Service Association, San Francisco, CA (US)

(72) Inventors: Horatio Nelson Huxham, Cape Town (ZA); Alan Joseph O'Regan, Cape Town (ZA); Tara Anne Moss, Cape Town (ZA); Hough Arie Van Wyk, Cape Town (ZA)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 14/769,073

(22) PCT Filed: Feb. 26, 2014

(86) PCT No.: PCT/IB2014/059253
§ 371 (c)(1),
(2) Date: Aug. 19, 2015

(87) PCT Pub. No.: WO2014/132193
PCT Pub. Date: Sep. 4, 2014

(65) Prior Publication Data
US 2016/0006718 A1    Jan. 7, 2016

(30) Foreign Application Priority Data

Feb. 26, 2013    (ZA) .................................. 2013/01441

(51) Int. Cl.
*H04L 29/06*    (2006.01)
*G06F 3/0488*    (2013.01)
(Continued)

(52) U.S. Cl.
CPC ........ *H04L 63/083* (2013.01); *G06F 3/04883* (2013.01); *G06F 3/04886* (2013.01);
(Continued)

(58) Field of Classification Search
CPC ... H04L 63/08; H04L 63/083; H04L 63/0281; G06F 3/04886; G06F 3/04883;
(Continued)

(56) References Cited

U.S. PATENT DOCUMENTS

| | | | |
|---|---|---|---|
| 5,805,702 A | 9/1998 | Curry et al. | |
| 5,940,510 A | 8/1999 | Curry et al. | |

(Continued)

FOREIGN PATENT DOCUMENTS

| | | |
|---|---|---|
| WO | WO2012070997 A1 | 5/2012 |
| WO | 20120174122 A2 | 12/2012 |
| WO | WO2013013192 A2 | 1/2013 |

OTHER PUBLICATIONS

"Exploring Google Wallet using the secure element interface" http://nelenkov.blogspot.com/2012/08/exploring-google-wallet-using-secure.html.
(Continued)

*Primary Examiner* — Shanto M Abedin
(74) *Attorney, Agent, or Firm* — Kilpatrick Townsend Stockton LLP

(57) ABSTRACT

The invention provides systems, methods and devices for performing passcode authentication. In one embodiment of the invention, a method of performing passcode authentication conducted at a mobile device is provided which comprises the steps of: receiving an authentication request from a security gateway; receiving a passcode entered by a user of the mobile device; comparing the entered passcode to a passcode offset securely stored in a hardware security module (HSM) coupled to the mobile device; and, if the entered
(Continued)

passcode corresponds with the passcode offset, generating a secure authentication confirmation message and transmitting the confirmation message to the security gateway; or, if the entered passcode does not correspond with the passcode offset, generating a secure authentication denial message and transmitting the authentication denial message to the security gateway.

25 Claims, 9 Drawing Sheets

(51) Int. Cl.
*G06F 21/31* (2013.01)
*G06F 21/35* (2013.01)
*G06F 21/36* (2013.01)
*G06F 21/34* (2013.01)

(52) U.S. Cl.
CPC .............. *G06F 21/31* (2013.01); *G06F 21/34* (2013.01); *G06F 21/35* (2013.01); *G06F 21/36* (2013.01); *H04L 63/0281* (2013.01)

(58) Field of Classification Search
CPC .......... G06F 21/31; G06F 21/36; G06F 21/35; G06F 21/34
USPC ........ 726/2–7; 705/67, 72, 75; 713/182–184
See application file for complete search history.

(56) References Cited

U.S. PATENT DOCUMENTS

| | | | |
|---|---|---|---|
| 5,949,880 A | 9/1999 | Curry et al. | |
| 6,105,013 A | 8/2000 | Curry et al. | |
| 6,237,095 B1 | 5/2001 | Curry et al. | |
| 2002/0010917 A1* | 1/2002 | Srikantan | H04L 29/06 725/1 |
| 2002/0143634 A1 | 10/2002 | Kumar et al. | |
| 2004/0044739 A1 | 3/2004 | Ziegler | |
| 2005/0036611 A1* | 2/2005 | Seaton | G06F 21/31 380/44 |
| 2005/0039010 A1 | 2/2005 | Grove | |
| 2005/0257099 A1* | 11/2005 | Bounkong | G06T 1/005 714/48 |
| 2006/0095385 A1* | 5/2006 | Atkinson | G06F 21/88 705/64 |
| 2007/0214496 A1* | 9/2007 | Perkins | H04L 63/0838 726/3 |
| 2007/0282756 A1* | 12/2007 | Dravenstott | G06Q 20/3823 705/72 |
| 2008/0072048 A1 | 3/2008 | Brown et al. | |
| 2008/0172341 A1* | 7/2008 | Crandell | G06F 21/31 705/75 |
| 2009/0132813 A1* | 5/2009 | Schibuk | G06Q 20/223 713/158 |
| 2010/0131764 A1* | 5/2010 | Goh | H04L 63/0464 713/171 |
| 2010/0179907 A1* | 7/2010 | Atkinson | G06Q 20/10 705/44 |
| 2012/0110333 A1 | 5/2012 | Lukkarila et al. | |
| 2012/0278614 A1 | 11/2012 | Choi | |
| 2012/0303534 A1* | 11/2012 | Keller | G06Q 30/0205 705/72 |
| 2013/0042111 A1* | 2/2013 | Fiske | H04L 9/3239 713/170 |
| 2013/0232084 A1* | 9/2013 | Ates | G06Q 20/32 705/67 |
| 2013/0282588 A1* | 10/2013 | Hruska | G06Q 20/10 705/67 |
| 2014/0258132 A1* | 9/2014 | Swamy | G06K 7/0004 705/67 |

OTHER PUBLICATIONS

"Google Wallet PINs easily stolen from rooted devices" http://nakedsecurity.sophos.com/2012/02/09/google-wallet-pins-easily-stolen-from-rooted-devices/.
International Search Report mailed Aug. 22, 2014 in PCT/IB2014/059253, 3 pages.
Patent Examination Report No. 1, mailed Jan. 21, 2016 in Australian Patent Application No. 2014222350, 3 pages.
Extended European Search Report dated Nov. 18, 2016 in connection with Application No. 14756277.1, 7 pages.

* cited by examiner

SYSTEMS, METHODS AND DEVICES FOR PERFORMING PASSCODE AUTHENTICATION

This application is a National Stage of International Application No. PCT/IB2014/059253, International Filing Date Feb. 26, 2014, and which claims the benefit of South African Patent Application No. 2013/01441, filed Feb. 26, 2013, the disclosures of both applications being incorporated herein by reference.

FIELD OF THE INVENTION

The invention relates to systems, methods and devices for performing passcode authentication.

BACKGROUND

Mobile devices such as mobile phones are taking on a broader role in facilitating the conducting and managing of financial affairs in what may be termed "mobile banking". A mobile banking system may allow users of the system to conduct financial transactions through, for example, a mobile phone. However, security limitations of mobile phones and mobile communication networks have, in some cases, posed a stumbling block that hinders the wide adoption and growth of mobile banking.

For instance, it is common for mobile phones to provide data encryption using only software. Such a device may comply with only a security level 1 of the Federal Information Processing Standard 140-2 (FIPS 140-2), which provides only a minimum level of security to protect sensitive information and may lack the capability to securely send end-to-end encrypted communication.

As a result, sensitive information, such as a Personal Identification Numbers (PINs) and Primary Account Numbers (PANs) should not be stored on mobile phones of a mobile banking system. This may pose limitations in authenticating financial transaction authorization requests, and may further mean that sensitive information, e.g. a PIN, is sent from the mobile phone over the communication network to backend systems in order to authenticate the request. This creates a vulnerability in which such sensitive information can be intercepted by malicious parties and be used for fraudulent purposes.

BRIEF SUMMARY

In accordance with a first aspect of the invention, there is provided a method of performing passcode authentication, the method being conducted at a mobile device and comprising the steps of:
  receiving an authentication request from a security gateway;
  receiving a passcode entered by a user of the mobile device;
  comparing the entered passcode to a passcode offset securely stored in a hardware security module (HSM) coupled to the mobile device;
  if the entered passcode corresponds with the passcode offset, generating a secure authentication confirmation message and transmitting the confirmation message to the security gateway; and,
  if the entered passcode does not correspond with the passcode offset, generating a secure authentication denial message and transmitting the authentication denial message to the security gateway.

Further features of the invention provide for the request to include an identifier usable by the security gateway in identifying a mobile device from which authentication is requested, for the identifier to be associated with a communication address of the mobile device in a database of the security gateway, and for the identifier to be provided by the user to a requestor device.

A still further feature of the invention provides for the step of comparing the entered passcode to a passcode offset securely stored in a HSM coupled to the mobile device to be performed by the HSM.

A yet further feature of the invention provides for the method to include a step of prompting the user of the mobile device to enter a passcode.

Further features of the invention provide for the step of comparing the entered passcode to a passcode offset to include steps of: hashing the entered passcode using a predetermined hash algorithm; and, comparing the hashed entered passcode to the passcode offset securely stored in the HSM coupled to the mobile device.

A still further feature of the invention provides for the steps of generating a secure authentication confirmation message or a secure authentication denial message to include digitally signing the secure authentication confirmation message or secure authentication denial message.

A yet further feature of the invention provides for the method to include a step of establishing encrypted communication between the mobile device and the security gateway to transmit the secure authentication confirmation message or secure authentication denial message.

Further features of the invention provide for the mobile device to have an auxiliary input device attached thereto and in communication therewith and in which the HSM is disposed, and for the step of receiving a passcode entered by the user of the mobile device to include receiving the passcode entered by the user into an input component of the auxiliary input device.

Still further features of the invention provide for, responsive to receiving an authentication request from a security gateway, the method to include the steps of: generating a scrambled keypad; graphically rendering the scrambled keypad on a display screen of an auxiliary input device or mobile device, with characters of the scrambled keypad being associated with touch-sensitive locations of an input component of the auxiliary input device or mobile device; identifying activated touch-sensitive locations of the input component of the auxiliary input device or mobile device corresponding to user input; and, identifying characters associated with the activated touch-sensitive locations so as to obtain a passcode entered by the user.

In accordance with a second aspect of the invention, there is provided a method of performing passcode authentication, the method being conducted at a security gateway and comprising the steps of:
  receiving an authentication request from a requestor device, the authentication request including an identifier usable in identifying a mobile device from which authentication is requested;
  forwarding the authentication request to a mobile device, the mobile device having a hardware security module (HSM) coupled thereto;
  receiving a secure authentication confirmation message or a secure authentication denial message from the mobile device, wherein the authentication confirmation message or authentication denial message is generated locally at the mobile device responsive to comparing an entered passcode with a passcode offset securely stored in the HSM coupled to the mobile device.

A further feature of the invention provides for the identifier to be provided by a user to the requestor device.

Still further features of the invention provide for the identifier to be associated with a communication address of the mobile device in a database of the security gateway and for the step of forwarding the authentication request to the mobile device to include a step of using the identifier included in the authentication request to obtain the communication address of the mobile device.

A yet further feature of the invention provides for the method to include a step of transmitting the authentication confirmation message or authentication denial message to one or both of a requestor device and a payment processing network.

A further feature of the invention provides for the method to include a step of establishing encrypted communication between the mobile device and the security gateway to receive the secure authentication confirmation message or secure authentication denial message.

In accordance with a third aspect of the invention, there is provided a system for performing passcode authentication, the system comprising a mobile device having:
- a request receiving component for receiving an authentication request from a security gateway;
- a passcode receiving component for receiving a passcode entered by a user of the mobile device;
- a comparing component for comparing the entered passcode to a passcode offset securely stored in HSM coupled to the mobile device; and
- a generating component for, if the entered passcode corresponds with the passcode offset, generating a secure authentication confirmation message and transmitting the confirmation message to the security gateway and, if the entered passcode does not correspond with the passcode offset, generating a secure authentication denial message and transmitting the authentication denial message to the security gateway.

Further features of the invention provide for the system to further include a security gateway having:
- a request receiving component for receiving an authentication request from a requestor device, the authentication request including an identifier usable in identifying a mobile device from which authentication is requested;
- a request forwarding component for forwarding the authentication request to the mobile device, the mobile device having a hardware security module (HSM) coupled thereto;
- an authentication message receiving component for receiving a secure authentication confirmation message or a secure authentication denial message from the mobile device, wherein the authentication confirmation message or authentication denial message is generated locally at the mobile device responsive to comparing an entered passcode with a passcode offset securely stored in the HSM coupled to the mobile device.

Still further features of the invention provide for the system to further include a requestor device having: an identifier receiving component for receiving an identifier; and, a request transmitting component for transmitting an authentication request to the security gateway.

Yet further features of the invention provide for the requestor device to be one or more of: a point-of-sale device; an electronic commerce server computer; a mobile device of a merchant or the like, and for the authentication request to be a transaction authorization request.

A further feature of the invention provides for communication between the HSM and the security gateway to be encrypted so that the authentication confirmation message or authentication denial message transmitted from the mobile device can be verified by the security gateway.

Still further features of the invention provide for the HSM to be disposed in a cryptographic expansion device that attaches to a communication component of the mobile device, for the HSM to be in electrical communication with the mobile device, for the HSM to securely store the passcode offset in a digital memory thereof, and for the passcode offset to be written to the digital memory of the HSM during manufacture or prior to distribution of the HSM.

Yet further features of the invention provide for the offset of the passcode to be a hash of the passcode, for the hash of the passcode to be obtained from a cryptographic hash algorithm and for the cryptographic hash algorithm to be a secure hash algorithm (SHA).

A further feature of the invention provides for the passcode to be one or more of the group of: a personal identification number (PIN); a password; a token; and a key.

Still further features of the invention provides for the mobile device to have an auxiliary input device attached thereto and in communication therewith and in which the HSM is disposed, and for receiving a passcode entered by the user of the mobile device to include receiving the passcode entered by the user into an input component of the auxiliary input device.

A yet further feature of the invention provides for the auxiliary input device to be a touch-sensitive film configured for attachment to a mobile device.

Further features of the invention provide for the mobile device or auxiliary input component to be further configured to: generate a scrambled keypad; graphically render the scrambled keypad on a display screen of the auxiliary input device or mobile device, with characters of the scrambled keypad being associated with touch-sensitive locations of the input component of the auxiliary input device or mobile device; identify activated touch-sensitive locations of the input component of the auxiliary input device or mobile device corresponding to user input; and, identify characters associated with the activated touch-sensitive locations so as to obtain a passcode entered by the user.

In accordance with a fourth embodiment of the invention there is provided a cryptographic expansion device for performing passcode authentication, the cryptographic expansion device comprising:
- a first set of electrical contacts disposed on a top side of the cryptographic expansion device for interfacing to a mobile device;
- a second set of electrical contacts disposed on a bottom side of the cryptographic expansion device for interfacing to a communication component;
- a coupling element configured to attach the cryptographic expansion device to the communication component; and
- a hardware security module (HSM) disposed in the cryptographic expansion device and coupled to the first and second sets of electrical contacts, the HSM to include a secure processing unit and a public processing unit, and wherein the HSM is configured to:
  receive a passcode entered by a user, compare the entered passcode to a passcode offset securely stored in the HSM;

if the entered passcode corresponds with the passcode offset, generate a secure authentication confirmation message and transmit the confirmation message to a security gateway; and if the entered passcode does not correspond with the offset, generate a secure authentication denial message and transmit the denial message to the security gateway.

Further features of the invention provide for the cryptographic expansion device to be a label, and for the communication component to be a subscriber identity module (SIM) card.

A still further feature of the invention provides for the offset of the passcode to be written to a digital memory of the HSM during manufacture.

In accordance with a fifth embodiment of the invention, there is provided an auxiliary input device configured for attachment to a mobile device, the auxiliary input device having:

a request receiving component for receiving an authentication request from a security gateway;

a passcode receiving component for receiving a passcode entered by a user of the mobile device;

a comparing component for comparing the entered passcode to a passcode offset securely stored in HSM coupled to the mobile device; and a generating component for, if the entered passcode corresponds with the passcode offset, generating a secure authentication confirmation message and transmitting the confirmation message to the security gateway and, if the entered passcode does not correspond with the passcode offset, generating a secure authentication denial message and transmitting the authentication denial message to the security gateway.

In accordance with a sixth aspect of the invention, there is provided a computer program product for performing passcode authentication, the computer program product comprising a computer-readable medium having stored computer-readable program code for performing the steps of:

receiving an authentication request from a security gateway; receiving a passcode entered by a user of the mobile device;

comparing the entered passcode to a passcode offset securely stored in a hardware security module (HSM) coupled to the mobile device;

if the entered passcode corresponds with the passcode offset, generating a secure authentication confirmation message and transmitting the confirmation message to the security gateway; and, if the entered passcode does not correspond with the passcode offset, generating a secure authentication denial message and transmitting the authentication denial message to the security gateway.

Further features of the invention provide for the computer-readable medium to be a non-transitory computer-readable medium, and for the computer-readable program code to be executable by a processing circuit.

In accordance with another aspect of the invention, there is provided a method of performing authentication locally at a mobile device, the method comprising the steps of:

receiving an authentication request from a security gateway; prompting a user of the mobile device to enter a passcode;

comparing the entered passcode to a passcode offset securely stored in a hardware security module (HSM) coupled to the mobile device;

if the entered passcode corresponds with the passcode offset, generating a secure authentication confirmation message and transmitting the confirmation message to a security gateway; and, if the entered passcode does not correspond with the passcode offset, generating a secure authentication denial message and transmitting the authentication denial message to the security gateway.

Further features of the invention provide for the authentication request to be received from the security gateway based on a request made by a requestor device to the security gateway in which a third party identifies the mobile device to the security gateway.

Yet further features of the invention provide for the requestor device to be a point-of-sale device and for the authentication request to be a transaction authorization request.

A still further feature of the invention provides for the communication between the HSM and the security gateway to be encrypted so that the authentication confirmation message or authentication denial message transmitted from the mobile device can be verified by the security gateway.

Further features of the invention provide for the HSM to be disposed in a cryptographic expansion device that attaches to a communication component of a mobile device, for the HSM to be in electrical communication with the mobile device, for the HSM to securely store the passcode offset in a digital memory thereof, and for the passcode offset to have been written to the digital memory of the HSM at manufacture or prior to distribution of the HSM.

Yet further features of the invention provide for the offset of the passcode to be a hash of the passcode, for the hash of the passcode to be obtained from a cryptographic hash algorithm and for the cryptographic hash algorithm to be a secure hash algorithm (SHA).

A still further feature of the invention provides for the passcode to be either a personal identification number or a password or both.

The invention extends to a method of obtaining authentication of a request at a security gateway, the method comprising the steps of:

receiving an authentication request from a requestor device, the authentication request identifying a mobile device from which authentication of a transaction is requested;

forwarding the authentication request message to the identified mobile device, the mobile device having a hardware security module (HSM) coupled thereto which enables communication between the security gateway and the HSM to be encrypted; and, receiving an authentication confirmation message or authentication denial message from the mobile device, where the authentication confirmation or denial message is determined locally at the mobile device by the mobile device prompting a user thereof to enter a passcode and comparing the entered passcode with a passcode offset stored in the HSM.

A further feature of the invention provides for the security gateway to be in communication with a payment processing network.

The invention further provides a system for performing authentication locally, the system comprising:

a plurality of requestor devices, each of which is configured to send an authentication request message;

a security gateway in communication with the requestor device and configured to receive the authentication request message from the requestor device and to forward the received authentication request message;

a plurality of mobile devices, each of which is in communication with the security gateway and configured to receive the forwarded authentication request message, prompt a user of the mobile device for a passcode, accept an entered passcode, compare the entered passcode with an offset thereof securely stored in a hardware security module (HSM) coupled to the mobile device, if the entered passcode corresponds with the passcode offset, generate a secure authentication confirmation message and transmit the confirmation message to a security gateway, and if the entered passcode does not correspond with the passcode offset, generate a secure authentication denial message and transmit the authentication denial message to the security gateway.

The invention further provides a cryptographic expansion device comprising:

a first set of electrical contacts disposed on a top side of the cryptographic expansion device for interfacing to a mobile device;

a second set of electrical contacts disposed on a bottom side of the cryptographic expansion device for interfacing to a communication component;

a coupling element configured to attach the cryptographic expansion device to the communication component; and a hardware security module (HSM) disposed in the cryptographic expansion device and coupled to the first and second sets of electrical contacts, the HSM to include a secure processing unit and a public processing unit, and configured to receive a user entered passcode from the mobile device, compare the entered passcode to a securely stored offset thereof, to generate an authentication confirmation message if the entered passcode corresponds to the offset, or to generate an authentication denial message if the entered passcode does not correspond to the offset, and to send the authentication confirmation message or authentication denial message to the mobile device.

Further features of the invention provide for the cryptographic expansion device to be a label, and for the communication component to be a subscriber identity module (SIM) card.

A further feature of the invention provides for the offset of the passcode to be written to a digital memory of the HSM at the time of manufacture.

DETAILED DESCRIPTION

In the specification to be, the term "passcode" includes any sensitive information including one or more words or strings of characters which may be compared to a securely stored replica or derivative thereof. A passcode may typically be used for authentication or authorization purposes or to permit access to a restricted resource. Exemplary passcodes include passwords; personal identification numbers (PINs); tokens; keys or the like.

Figure 1:
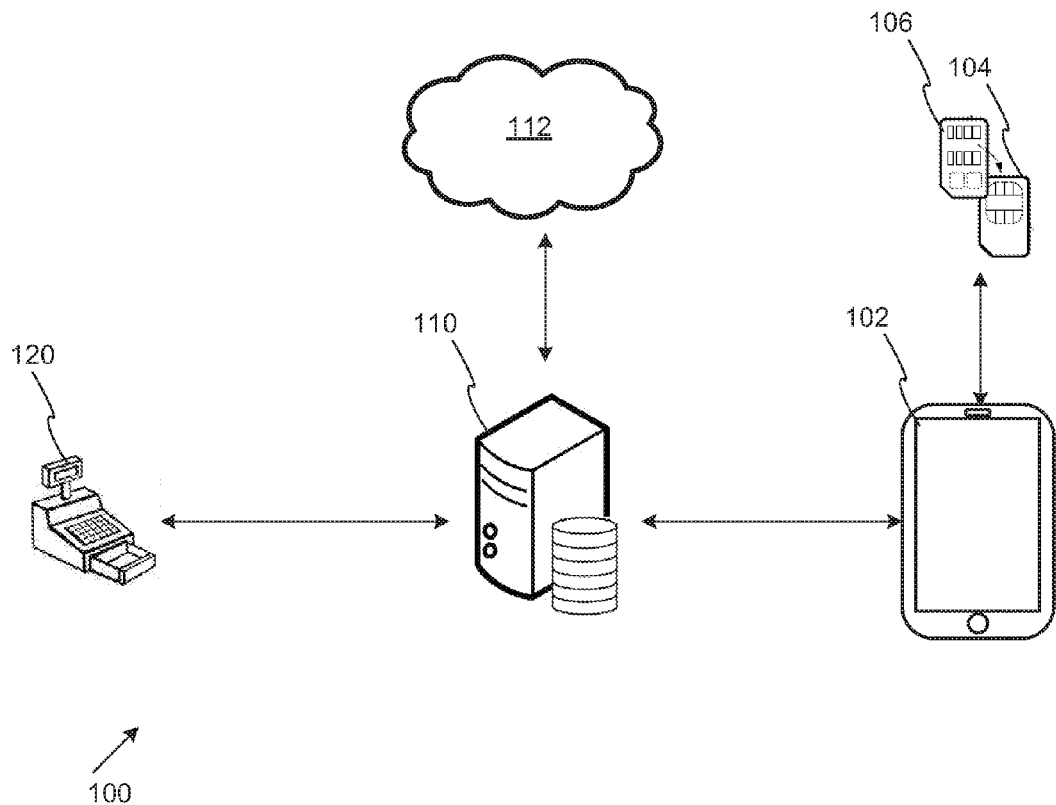
FIG. 1 illustrates a block diagram of a system according to an embodiment of the invention.

FIG. 1 illustrates a block diagram of a system (100) according to a first embodiment of the invention which comprises a plurality of mobile devices (102) each of which having a hardware security module (HSM) coupled thereto and in communication therewith. In the illustrated embodiment the mobile device (102) has a communication component being a subscriber identity module (SIM) card (104) and a cryptographic expansion device (106) attached thereto and in which the HSM is disposed. In other embodiments, the HSM may be disposed in the mobile device (102) itself. The system (100) further comprises a plurality of requestor devices (120) and a security gateway (110). It will be appreciated that although only one mobile device and one requestor device is shown, that a practical system will include a plurality of such devices.

The mobile device (102), SIM card (104) and cryptographic expansion device (106) are in electrical communication with each other, the cryptographic expansion device (106) being attached to the SIM card (104), which in turn is inserted into the mobile device (102). The mobile device (102) according to the illustrated embodiment may be any suitable communication device configured for engaging or allowing a user to participate in mobile banking, for example a mobile phone, tablet computer, personal digital assistant or the like.

The cryptographic expansion device (106) is a device that can be attached to a communication component, in this case a SIM card (104), of a mobile device (102) to enable the mobile device (102) to perform cryptographic operations on communications sent to and from the mobile device (102). When used with a mobile device (102), the cryptographic expansion device enables the mobile device (102) to send and receive end-to-end secure encrypted communications.

The secure encrypted communications can include sending secure communications using a communication protocol which may be selected from a group consisting of Short Message Service (SMS) protocol, Unstructured Supplementary Service Data (USSD) protocol, Near Field Communication (NFC) protocol, and Radio Frequency (RF) communications protocol. The cryptographic expansion device (106) can be used with a mobile device (102) without requiring any changes to the internal software or hardware of the mobile device and without requiring any modification to the communication protocols of the mobile device. In some embodiments, the end-to-end secure communications enabled by the cryptographic expansion device (106) can be utilized by a user of the mobile device (102) to perform financial and/or banking transactions. Such a cryptographic expansion device is fully described in PCT Publication Number WO/2013/013192 which is incorporated herein by reference in its entirety. According to embodiments of the invention, the cryptographic expansion device is configured to securely store an offset of a passcode in a digital memory therein. In other embodiments, the mobile device (102) may have an HSM disposed therein and in communication therewith such that functionality of the cryptographic expansion device (106) may be performed by the HSM of the mobile device (104) in which case a cryptographic expansion device (106) may not be required. In some embodiments the passcode offset may be written to the digital memory of the HSM at or during manufacture or prior to distribution of the HSM.

The HSM provided according to embodiments of the invention may be any appropriate HSM be capable of performing encryption or decryption using, for example, Advance Encryption Standard (AES), Data Encryption Standard (DES), Triple Data Encryption Standard/Algorithm (TDES/TDEA), Secure Socket Layer (SSL), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols.

The HSM is different from devices that may solely use software to encrypt data. A device that solely uses software to encrypt communications may comply with only a security level 1 of the Federal Information Processing Standard 140-2 (FIPS 140-2), which provides only a minimum level of security to protect sensitive information. In contrast, the HSM coupled to the mobile device according to embodiments of the invention is compliant with at least a security level 2 of the FIPS 140-2 standard. Preferably, the HSM coupled to the mobile device in embodiments of the invention is compliant with security level 3 or level 4 of FIPS 140-2.

The HSM uses hardware to encrypt data instead of solely performing the encryption in software and may be configured to encrypt data immediately upon, or directly after, entry, before being transmitted from the device or otherwise passed to any downstream software or hardware. The HSM may provide secure key management to generate cryptographic keys, set the capabilities and security limits of keys, implement key backup and recovery, prepare keys for storage and perform key revocation and destruction. In some embodiments, the HSM is implemented as a dual processor device that includes a secure processor with secure storage and a public processor with storage. The secure processor may be a cryptoprocessor and may have a cryptographic arithmetic logic unit (ALU) which is optimized for performing certain cryptographic functions. The HSM may also include a physical or logical separation between interfaces that are used to communicate critical security parameters and other interfaces that are used to communicate other data. The HSM can also provide a tamper-proof mechanism that provides a high risk of destroying the HSM and the cryptographic keys stored therein, if any attempt is made to remove or externally access the HSM.

The mobile device (102) may be configured to receive an authentication request from the security gateway (110), prompt a user for a passcode, receive a passcode entered by the user and to compare the passcode to an offset thereof stored within the HSM of the mobile device (102). If the entered passcode corresponds to the offset, the mobile device is configured to generate a secure authentication confirmation message and to transmit the authentication confirmation message to the security gateway (110). If the entered passcode does not correspond to the offset thereof, the mobile device (102) is configured to generate a secure authentication denial message and to transmit the authentication denial message to the security gateway (110). The mobile device (102) may be further configured to establish encrypted communication with the security gateway (110) to transmit the secure authentication confirmation message or secure authentication denial message.

The requestor device (120) may be any suitable device, for example an appropriately modified point-of-sale (POS) device or a mobile device of a merchant or other third party, and is in communication with the security gateway (110). Another exemplary requestor device (120) includes an electronic commerce server of an electronic commerce merchant or the like. The communication between the security gateway (110) and the requestor device (120) is preferably encrypted, the encryption method may, for example, be provided by the secure sockets layer (SSL) cryptographic protocols. The requestor device (120) may be configured to receive an identifier which may be a mobile device identifier from a user and to transmit an authentication request to the security gateway (110).

The security gateway (110) may be any appropriate server computer or distributed server computer and is in communication with the plurality of requestor devices (120) and the plurality of mobile devices (102). Communication between a mobile device (102) and the security gateway is end-to-end secure. In addition to this, the security gateway may be configured to send and receive encrypted messages to and from an HSM of the mobile device (102). In addition to this, the security gateway (110) may also be in communication with a host network (112), which may, for example, be a payment processing network or other financial network. The security gateway (110) may be configured to prevent unauthorized devices from connecting to the host network (112). The payment processing network may in turn be in communication with facilities of various financial institutions which may be issuing financial institutions or acquiring financial institutions to users or merchants as may be required.

The security gateway (110) may be configured to receive an authentication request from the requestor device (120) including an identifier usable in identifying a mobile device from which authentication is requested. In some embodiments, the security gateway (110) may have a database in which identifiers of users may be associated with communication addresses of mobile devices of the corresponding users. In some embodiments the identifiers may be communication addresses of mobile devices. For example an identifier may be a mobile subscriber integrated digital service network (MSISDN) number of a user's mobile device and may thus be usable as the communication address.

Embodiments of the invention provide for the security gateway (110) to be configured to use the identifier included in the request to obtain the communication address of the mobile device. The security gateway (110) may further be configured to establish encrypted communication between the mobile device and the security gateway and to forward the authentication request to the identified mobile device (102). The security gateway (110) is further configured to receive a secure authentication confirmation message or secure authentication denial message from the mobile device (102) and to transmit the received secure authentication confirmation message or secure authentication denial message to one or both of the requestor device (120) and the payment processing network.

Embodiments of the system (100) accordingly provide for the requestor device (120) to generate an authentication request message and to send the authentication request message to the security gateway (110). The authentication request message may be a transaction authorization request message, or a request to authenticate a user instruction, such as an instruction to open an account. The authentication request message may contain an identifier or mobile device identifier identifying or usable in identifying a mobile device of the user, for example an MSISDN number.

The security gateway (110) then receives the authentication request message from the requestor device (120) and, using the mobile device identifier, forwards the authentication request to the mobile device (102) corresponding the mobile device identifier in a forwarded authentication request message.

The forwarded authentication request message is received at the mobile device (102) and is communicated to the cryptographic expansion device (106). The cryptographic expansion device (106) may then interpret the forwarded authentication request message, and prompts a user for a passcode via the mobile device (102). Upon receiving a user-entered passcode via the mobile device, the cryptographic expansion device (106) compares the entered passcode with passcode offset securely stored in a digital memory of the cryptographic expansion device (106). Should the entered passcode correspond to the securely stored offset, the cryptographic expansion device is configured to generate an authentication confirmation message and to transmit the authentication confirmation message to the security gateway via the mobile device. Alternatively, should the entered passcode and the securely stored offset not correspond, the cryptographic expansion device (106) is configured to generate an authentication denial message and to transmit the authentication denial message to the security gateway via the mobile device (102).

The authentication confirmation and authentication denial messages may be encrypted or hashed such that false authentication confirmation and authentication denial messages are harder to generate by other devices purporting to be the user's mobile device (102). Thus the invention provides for the authentication confirmation and authentication denial messages to be verifiable by the security gateway (110) so as to ensure the messages originated from the user's mobile device (102).

The security gateway (110) may then relay the authentication confirmation message or authentication denial message to the requestor device (120) and/or the host network (112) such that the request, having been authenticated, can be processed.

In the exemplary embodiment described above, the passcode may be a personal identification number (PIN) or a password or both. The passcode may be chosen by a user of the system or may be assigned. Furthermore, the invention provides for the passcode offset to be a hash of the passcode. The hash of the passcode may be formed according to any cryptographic hash function. A cryptographic hash function may be generally defined as an algorithm which takes an arbitrary block of data and returns a fixed-size bit string. Accordingly, a passcode may be 'hashed' so as to form a hash thereof. Copies of the passcode may then be stored and used to verify or authenticate the passcode. For example, a passcode entered by a user can be authenticated by hashing the entered passcode, and comparing this hashed passcode with a stored hash of the passcode. Examples of cryptographic hash algorithms include the secure hash algorithm (SHA), such as SHA-2, SHA-224, SHA-256, and the like.

Figure 2:
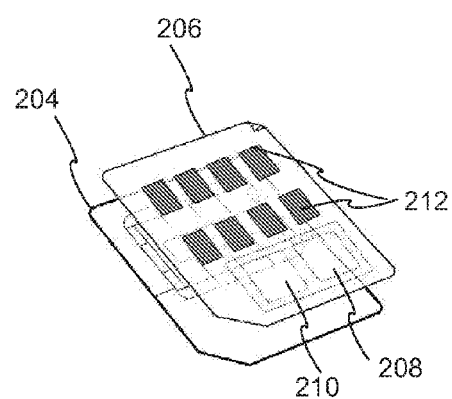
FIG. 2 illustrates a cryptographic expansion device according to an embodiment of the invention.

FIG. 2 shows a cryptographic expansion device (206) according to embodiments of the invention which comprises a first set of electrical contacts (212) disposed on a top side of the cryptographic expansion device (206) for interfacing to a mobile device and a second set of electrical contacts disposed on a bottom side of the cryptographic expansion device (206) for interfacing to a communication component (204), which in the illustrated embodiment is a subscriber identity module (SIM) card. The cryptographic expansion device (206) also comprises a coupling element configured to attach the cryptographic expansion device (206) to the communication component (204) as well as an HSM disposed in the cryptographic expansion device (206) and coupled to the first and second sets of electrical contacts. The HSM includes a secure processing unit (208) and a public processing unit (210) and is configured to receive a user entered passcode from the mobile device and to compare the entered passcode to a securely stored offset thereof. The HSM is further configured to generate an authentication confirmation message if the entered passcode corresponds to the offset, or to generate an authentication denial message if the entered passcode does not correspond to the offset, and to send the authentication confirmation message or authentication denial message to the mobile device for communication to the security gateway.

Figure 3:
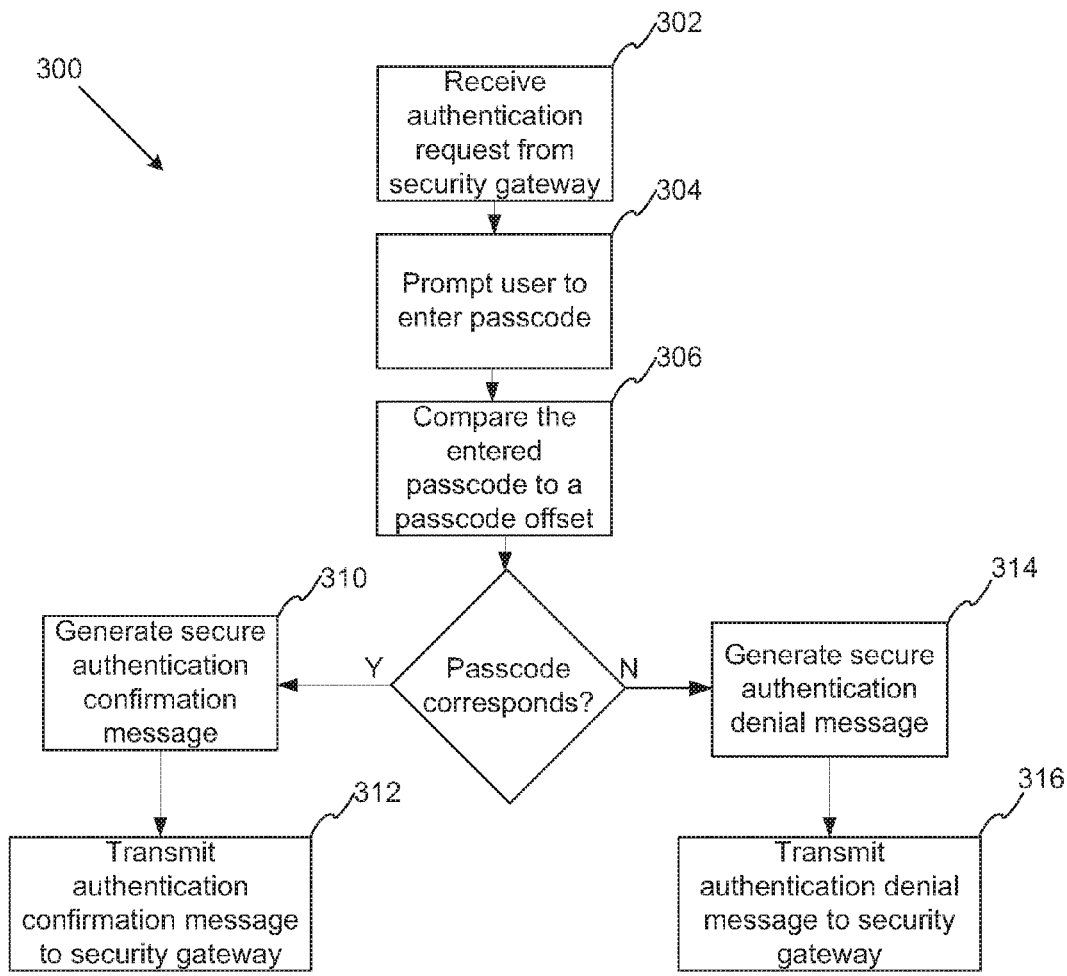
FIG. 3 illustrates a block diagram of method according to an embodiment of the invention.

The following methods are described with reference to the system and devices disclosed in the foregoing description. FIG. 3 illustrates a block diagram of a method (300) for performing authentication locally according to embodiments of the invention. The method is conducted at a mobile device and comprises a series of steps. In a first step (302), the mobile device receives an authentication request from a security gateway and communicates this authentication request to an HSM which may be coupled to the mobile device. In a next step (304), a user of the mobile device is prompted to enter a passcode. A passcode entered by the user is then compared to a passcode offset securely stored in the HSM coupled to the mobile device in a following step (306) and a decision is made as to whether or not the passcode corresponds with the securely stored offset. If it is decided that the passcode corresponds to the offset, the HSM generates a secure authentication confirmation message in a first confirmation step (310) and communicates this message to the security gateway in a second confirmation step (312). If, on the other hand, it is decided that the passcode does not correspond to the offset, a secure authentication denial message is generated in a first denial step (314) which is then communicated to the security gateway in a second denial step (316).

Figure 4:
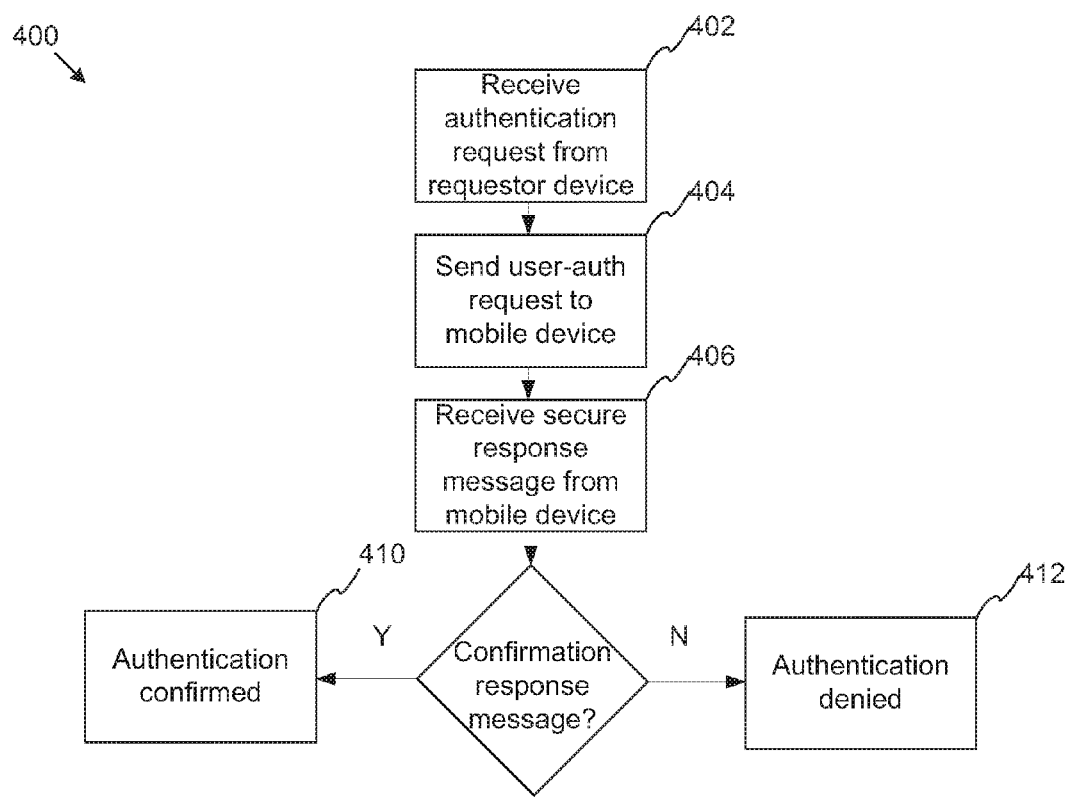
FIG. 4 illustrates a block diagram of another method according to an embodiment of the invention.

FIG. 4 illustrates a block diagram of a method (400) for performing authentication locally according to embodiments of the invention, wherein the method is conducted at a security gateway and comprises a series of steps. In a first step (402), an authentication request is received from a requestor device, wherein the authentication request may identify a mobile device from which authentication of a transaction is requested. In a next step (404), the authentication request message is forwarded to the identified mobile device. The mobile device may have an HSM coupled thereto which enables communication between the security gateway and the HSM to be encrypted and end-to-end secure. In a next step (406), an authentication confirmation message or authentication denial message is received from the mobile device, where the authentication confirmation or denial message is determined locally at the mobile device by the mobile device prompting a user thereof to enter a passcode and comparing the entered passcode with a passcode offset stored in the HSM. Based on whether or not an authentication confirmation message or authentication denial message was received at the security gateway from the mobile device, the security gateway may either indicate to the requestor device that the authentication request was confirmed or denied in a following step (410, 412).

Figure 5:
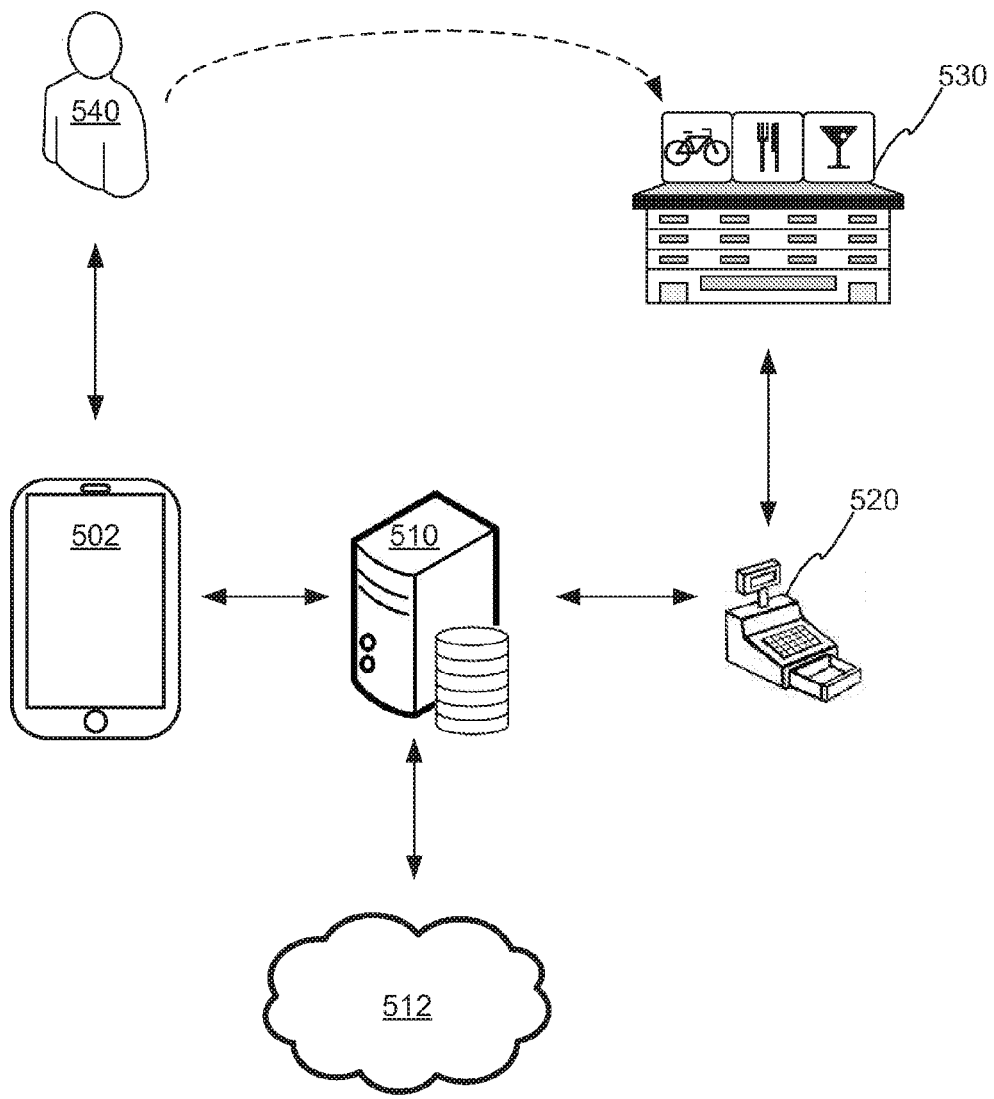
FIG. 5 illustrates a block diagram of an in-use scenario of a system according to an embodiment of the invention.

FIG. 5 shows an exemplary in-use scenario of systems and methods according to embodiments of the invention. A user (540) wishing to transact, for example wishing to order goods or services from a third party or merchant (530) remotely, provides the third party (530) with a mobile identifier of his or her mobile device (502) along with order information. The information may, for example, be provided by the user (540) to the third party (530) over a telephone call. The third party (530) then authenticates the transaction request from the user (540) by sending an authentication request message to a security gateway (510) using a requestor device (520) of the third party (530). The requestor device (520) may be an appropriately configured point-of-sale device, a mobile phone having an appropriate software application resident therein or the like. The authentication request message may also contain the mobile identifier of the user's mobile device (502) which was provided by the user (540). Upon receiving the authentication request message, the security gateway (510) extracts the mobile identifier from the authentication request message and forwards the authentication request message to a mobile device (502) corresponding to the mobile identifier. As the mobile device (502) has an HSM according to embodiments of the invention, the communication link between the security gateway (510) and the mobile device (502) is end-to-end secure. In addition to this, the forwarded authentication request message may also be encrypted. The forwarded authentication request message is received at the mobile device (502) over the secure communication link and the mobile device (502) then prompts the user (540) to enter a passcode. The user (540) enters his or her passcode into his or her mobile device (502) in order to authenticate the transaction. The entered passcode is compared with an offset thereof at the mobile device (502) and, if the passcode corresponds to the offset, a secure authentication confirmation message is generated at the mobile device which is securely communicated to the security gateway (510). The security gateway (510) may then communicate the authentication confirmation message to a payment processing network (512) such that the transaction between the third party (530) and the user (540) is finalized. The authentication confirmation message may also be communicated to the third party (530). Alternatively, if the passcode does not correspond to the offset thereof, a secure transaction denial message is generated and securely communicated to the security gateway (510) which may then indicate to the payment processing network (512) as well as the third party that the authentication was unsuccessful.

The systems, methods and devices described above accordingly provide for a user to provide authentication for, for example a transaction request, locally and off-line using an HSM equipped mobile device. In this manner, it may be possible for a transaction to be regarded as a 'card-present' transaction, even though the user and a merchant issuing the transaction request may not be in the same geographical location.

Figure 6:
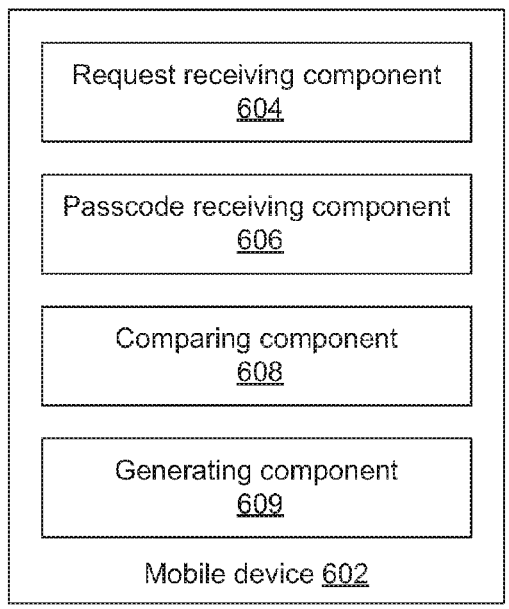
FIG. 6 is a block diagram which illustrates components of a mobile device for performing passcode authentication according to embodiments of the invention.

FIG. 6 is a block diagram which illustrates components of a mobile device (602) for performing passcode authentication according to embodiments of the invention. The mobile device (602) includes a request receiving component (604) for receiving an authentication request from a security gateway and a passcode receiving component (606) for receiving a passcode entered by a user of the mobile device. The mobile device (602) also includes a comparing component (608) for comparing the entered passcode to a passcode offset securely stored in HSM coupled to the mobile device (602) and a generating component (609) for, if the entered passcode corresponds with the passcode offset, generating a secure authentication confirmation message and transmitting the confirmation message to the security gateway. If the entered passcode does not correspond with the passcode offset, the generating component generates a secure authentication denial message and transmits the authentication denial message to the security gateway.

Figure 7:
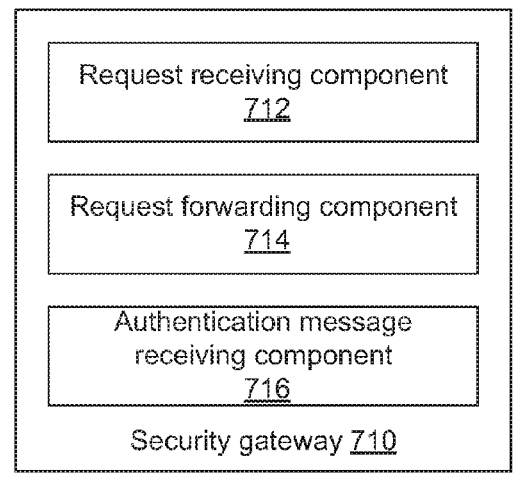
FIG. 7 is a block diagram which illustrates components of a security gateway for performing passcode authentication according to embodiments of the invention.

FIG. 7 is a block diagram which illustrates components of a security gateway (710) for performing passcode authentication according to embodiments of the invention. The security gateway (710) includes a request receiving component (712) for receiving an authentication request from a requestor device. The authentication request may include an identifier which is usable in identifying a mobile device from which authentication is requested. The security gateway (710) further includes a request forwarding component (714) for forwarding the authentication request to the mobile device which may have a hardware security module (HSM) coupled thereto. The security gateway (710) includes an authentication message receiving component (716) for receiving a secure authentication confirmation message or a secure authentication denial message from the mobile device. The authentication confirmation message or authentication denial message may be generated locally at the mobile device responsive to comparing an entered passcode with a passcode offset securely stored in the HSM coupled to the mobile device.

Figure 8:
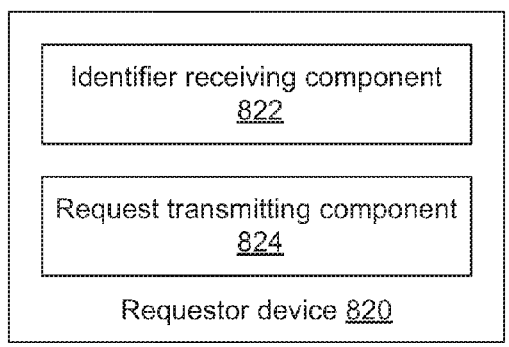
FIG. 8 is a block diagram which illustrates components of a requestor device for performing passcode authentication according to embodiments of the invention.

FIG. 8 is a block diagram which illustrates components of a requestor device (820) for performing passcode authentication according to embodiments of the invention. The requestor device (820) includes an identifier receiving component (822) for receiving an identifier and a request transmitting component (824) for transmitting an authentication request to the security gateway.

Figure 9:
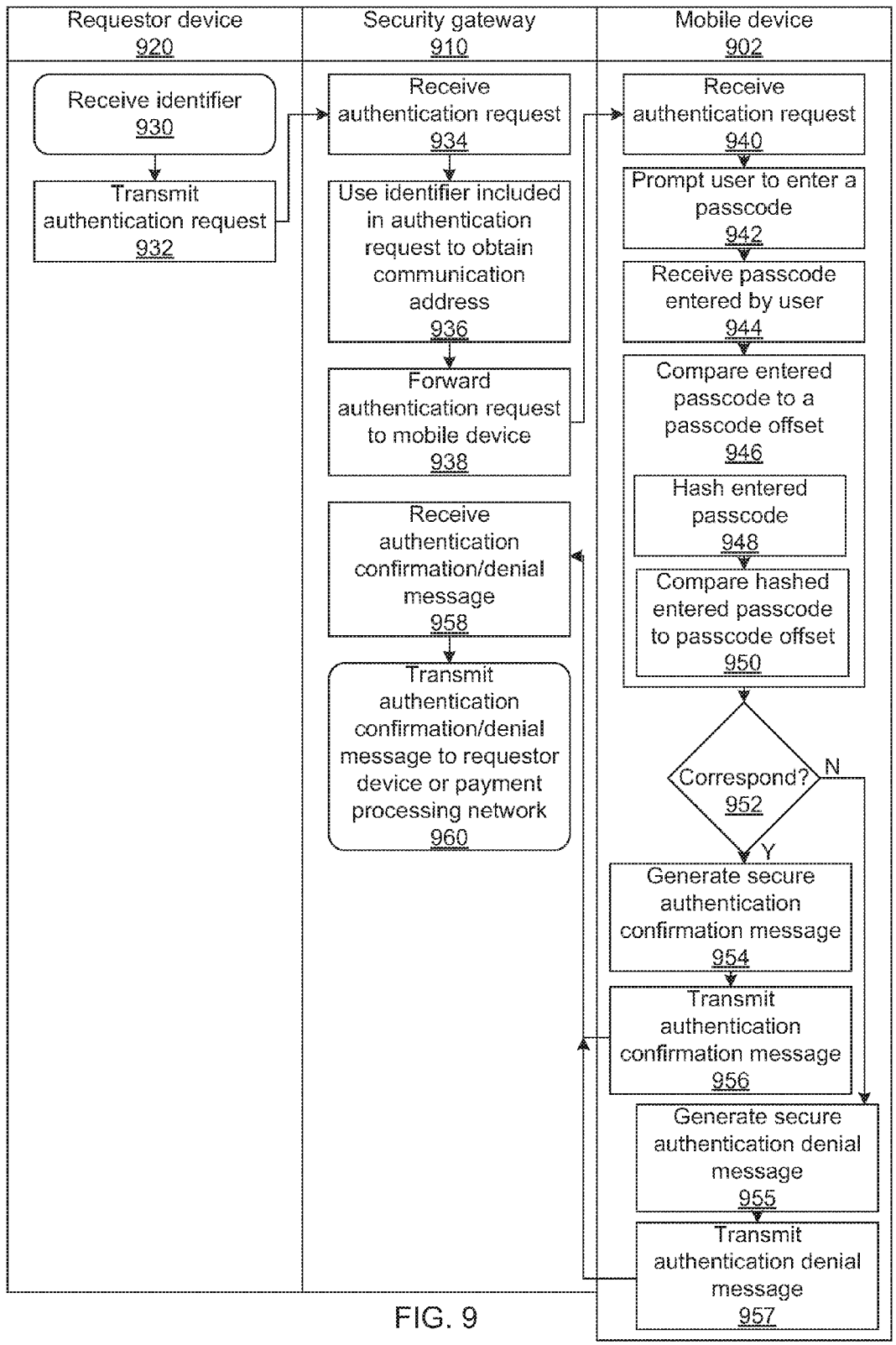
FIG. 9 is a swim-lane flow diagram which illustrates an exemplary in-use scenario of methods, systems and devices according to embodiments of the invention.

FIG. 9 is a swim-lane flow diagram which illustrates an exemplary in-use scenario of methods, systems and devices according to embodiments of the invention. Respective swim-lanes serve as to indicate the roles or responsibilities of respective devices in performing methods according to embodiments of the invention.

In the illustrated exemplary scenario, a user may wish to purchase a product from a merchant. The merchant may be a brick-and-mortar merchant in which case the user is physically located, for example, at a till point, or checkout point of the merchant and may be able to input information, such as an identifier, into the merchant's requestor device (920). Alternatively, the merchant may be an electronic commerce merchant and may thus be remote from the user. The user may be in communication with the merchant requestor device (920) being an electronic commerce server of the merchant via, for example, the internet, or with an interactive voice response server or telephone operator of the merchant telephonically.

In the exemplary scenario, the user may have pre-registered with the merchant in question meaning that he or she may have provided payment credentials to the merchant which the merchant securely stores. Alternatively, the user's payment credentials may be securely stored at an issuing financial institution of the user and may only be transmitted from the issuing financial institution upon receipt of an authentication confirmation message originating from the user' mobile device (902). In yet another case, the user may provide payment credentials at the time of providing the identifier to the merchant, the payment credentials only being usable upon receipt of an authentication confirmation message.

The payment credentials may include a bank identification number (BIN), a primary account number (PAN), a card verification value (CVV1 or CVV2) or similar number, a cardholder name, an expiry date, or the like. In some embodiments the payment credentials include full Track 2 payment credentials or Track 2 equivalent payment credentials. The payment credentials may also include bank account numbers, vouchers, loyalty coupons, reference numbers or the like.

In a first step (930) in any one of the above scenarios, the requestor device (920) receives an identifier provided to the requestor device (920) by the user. The user may, for example, key the identifier into the requestor device or transmit the identifier to the requestor device over internet or the like. The identifier may be any appropriate identifier such as one or more of the group of: a mobile subscriber integrated services digital network (MSISDN) number, a unique code, a name of the user, an identity number, an email address or the like.

In a next step (932), the requestor device (920) transmits an authentication request to a security gateway (910). The request includes the identifier and may further include information relating to the request. In the illustrated embodiment, the request is a transaction authorization request and thus may include details pertaining to the transaction such as a transaction amount, merchant information, details of products, goods or services being purchased, payment credentials or the like.

In a following step (934), the security server (910) receives an authentication request from the requestor device (920) which includes an identifier which is usable in identifying a mobile device (902) from which authentication is requested. The identifier may be associated with a communication address of the mobile device (902) in a database of the security gateway. Thus in a next step (936), the security gateway (910) may use the identifier included in the authentication request to obtain the communication address of the mobile device by querying the database accordingly. In some embodiments of the invention, the identifier may be the communication address of the mobile device (902).

In a following step (938), the security gateway (910) forwards the authentication request received from the requestor device (920) to the identified mobile device (902) having a hardware security module (HSM) coupled thereto. The authentication request may for example be sent in a secure message over a mobile communication network or the like.

The mobile device (902) then, in a next step (940), receives the authentication request from the security gateway (910). Responsive to receiving the request, the mobile device (902) in a following step (942) may prompt the user thereof, typically being the user who provided the identifier to the requestor device (920), to enter a passcode into the mobile device (102) so as to provide the requested authentication.

The mobile device (902) receives the passcode entered by the user of the mobile device (910) in a next step (944) and, in a following step (946), compares the entered passcode to a passcode offset securely stored in a hardware security module (HSM) coupled to the mobile device (910). In preferred embodiments, the comparison is conducted by the hardware security module and in some embodiments the step (946) of comparing the entered passcode to a passcode offset securely stored in a hardware security module includes a next step (948) of hashing the entered passcode using a predetermined hash algorithm and a following step (950) of comparing the hashed entered passcode to the passcode offset securely stored in the HSM coupled to the mobile device (902).

If (952) the entered passcode corresponds with the passcode offset, the mobile device (902) in a next step (954) generates a secure authentication confirmation message and in a following step (956) transmits the confirmation message to the security gateway (910). If (952) the entered passcode does not correspond with the passcode offset, the mobile device (902) in an alternate step (955) generates a secure authentication denial message and transmits the authentication denial message to the security gateway (910) in a following step (957).

The steps (956, 957) of generating a secure authentication confirmation message or a secure authentication denial message as the case may be may include digitally signing the secure authentication confirmation message or secure authentication denial message. For example the secure authentication confirmation message or secure authentication denial message, as the case may be, may be encrypted with a private key of the user so as to authenticate the message as having originated from the user's mobile device.

In some embodiments of the invention, a step of establishing encrypted communication between the mobile device (902) and the security gateway (910) to transmit the secure authentication confirmation message or secure authentication denial message may be conducted. This step may be conducted prior to the security gateway forwarding the authentication request, and/or prior to the mobile device (902) transmitting the authentication confirmation or authentication denial message.

In a next step (958), the security gateway (910) receives the secure authentication confirmation message or secure authentication denial message, as the case may be, from the mobile device (910).

Embodiments of the invention provide for the security gateway (910), in a following step (960), to transmit the authentication confirmation message or authentication denial message, as the case may be, to one or both of the requestor device (920) and a payment processing network. In some embodiments the authentication confirmation message or authentication denial message may be translated or reformatted into a form understandable or interpretable by the requestor device (920) or payment processing network.

In embodiments where the authentication confirmation message is transmitted to the requestor device (920), the requestor device (920) may, responsive to receiving the message, be configured to request payment credentials from the user's issuing financial institution via, for example, the merchant's acquiring financial institution and a payment processing network. In embodiments of the invention where the authentication confirmation message is transmitted to the payment processing network, the payment processing network may request payment credentials or transaction clearance from the issuing financial institution of the user as may be appropriate. In yet further embodiments as discussed above, the user may have already provided the merchant with payment credentials in which case the authentication request and subsequent authentication confirmation message (if the request is so confirmed) may serve as authorization to the user's issuing financial institution from the user for the specific transaction. In other words, the user may authorize each transaction and such authorization may be verifiable as having originated from the user.

Embodiments of the invention further provide an auxiliary input device which may be attached or fastened to the mobile device and in communication therewith. The auxiliary input device may have an HSM disposed therein and receiving a passcode entered by a user of the mobile device as has been described in the forgoing may include receiving the passcode entered by the user into an input component of the auxiliary input device. In some embodiments of the invention the HSM of the auxiliary input device may replace or make redundant functionality of the HSM of the mobile device while in other embodiments the HSM of the auxiliary input device may complement functionality of the HSM of the mobile device.

Figure 10:
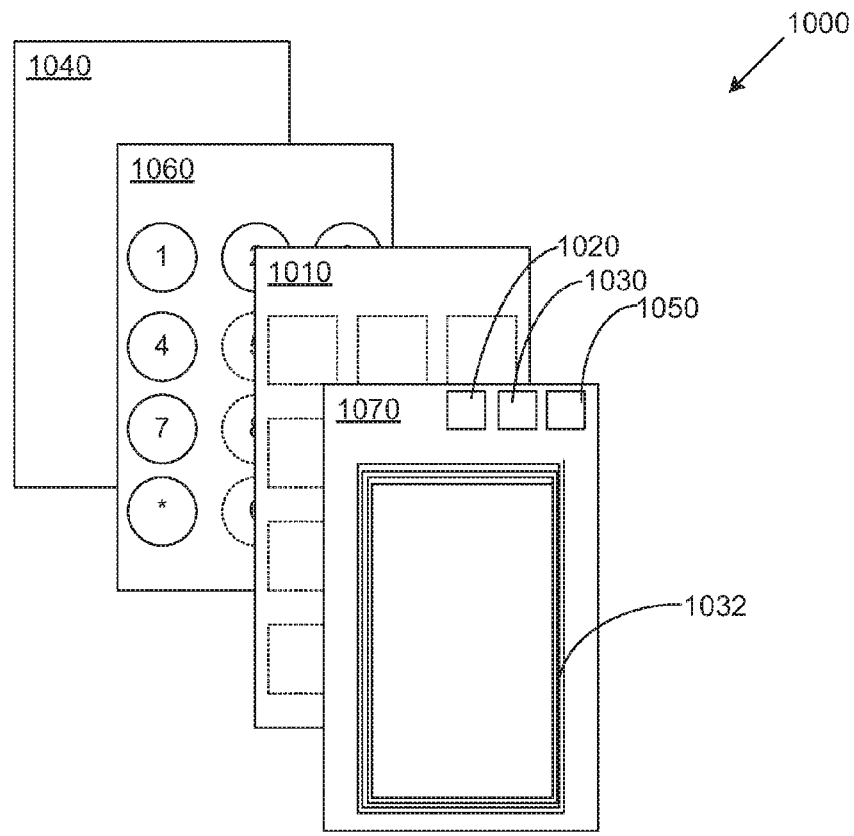
FIG. 10 is a schematic diagram which illustrates a deconstructed view of an exemplary auxiliary input device according to embodiments of the invention.

FIG. 10 is a schematic diagram which illustrates a deconstructed view of an exemplary auxiliary input device (1000) according to embodiments of the invention. In the illustrated embodiment, the auxiliary input device (1000) is disposed in a touch-sensitive film. The touch-sensitive film includes multiple layers in which various components are disposed and may be, for example fastened or attached to a display screen of a mobile device. In some embodiments, the touch-sensitive film may substantially resemble, as judged by the eye, a screen protector or similar which is commonly placed on display screens of mobile devices.

The auxiliary input device (1000) provides an adhesive layer (1040) which may be fastened to a bottom side of the auxiliary input device (1000). The adhesive layer (1040) may thus be used to attach the auxiliary input device (1000) to a mobile device.

An output component (1060) of the auxiliary input device (1100) is provided by a display screen layer which may be substantially transparent when no output is displayed. In the illustrated embodiment, the output component (1060) is displaying a numeric keypad which may, in one example, be used to enter a passcode. In this manner, a user may be visually guided as to where on the auxiliary input device (1000) he or she should press in order to enter a specific character.

An input component (1010) of the auxiliary input device (1100) is provided by touch-sensitive layer. The input component (1010) may thus configured to detect or identify a location on an x-y plane defined by the layer, at which a user's finger may, for example, come into contact with the auxiliary input device (1000). By comparing this location to what is being displayed on the output component (1060) at the time at which the user's finger location is determined, the auxiliary input device (1000) may be able to obtain user input. Embodiments of the invention provide for the auxiliary input device (1000) to be configured to generate a scrambled keypad. For example, by displaying characters at random positions of the output component (1060), the auxiliary input device (1000) may be able to receive a user's input without a touch sensitive display screen of a mobile device attached to the auxiliary input device being able to decipher that input.

The auxiliary input device (1000) further includes a protective layer (1070) in which an HSM (1020), communication module (1030) and power harvesting component (1050) may be disposed. In addition to this, the protective layer (1070) may include an antenna (1032) which may be used by one or both of the communication module (1030) and the power harvesting component (1050).

The HSM (1020) may be configured to compare the entered passcode to a passcode offset securely stored therein and to generate, if the entered passcode corresponds with the passcode offset, a secure authentication confirmation message and transmit the confirmation message to the security gateway. If the entered passcode does not correspond with the passcode offset, the HSM (1020) may generate a secure authentication denial message and transmit the authentication denial message to the security gateway.

The communication module (1030) may be for receiving an authentication request from a security gateway which may include receiving an authentication request from the security gateway via the mobile device. The communication module (1030) may also be for transmitting a secure authentication confirmation message or a secure authentication denial message to the security gateway which may include transmitting the secure authentication confirmation message or secure authentication denial message via the mobile device.

In other embodiments of the invention, the different components may be disposed in different layers. For example, the HSM (1020) may be disposed in the adhesive layer (1040) or output component (1060). Furthermore, embodiments of the invention provide for the layers to be provided in different orders. In some embodiments, the output component (1060), for example, may comprise further display-related layers (as has been described above). Additionally, the output component (1060) and the input component (1010) may be provided together as a composite touch-sensitive display screen layer.

In some embodiments of the invention the auxiliary input device (1000) may further include a request receiving component for receiving an authentication request from a security gateway and a passcode receiving component for receiving a passcode entered by a user of the mobile device. The auxiliary input device (1000) may also include a comparing component for comparing the entered passcode to a passcode offset securely stored the HSM (1020) coupled to the auxiliary input device (1000) and a generating component for, if the entered passcode corresponds with the passcode offset, generating a secure authentication confirmation message and transmitting the confirmation message to the security gateway. If the entered passcode does not correspond with the passcode offset, the generating component generates a secure authentication denial message and transmits the authentication denial message to the security gateway.

Figure 11:
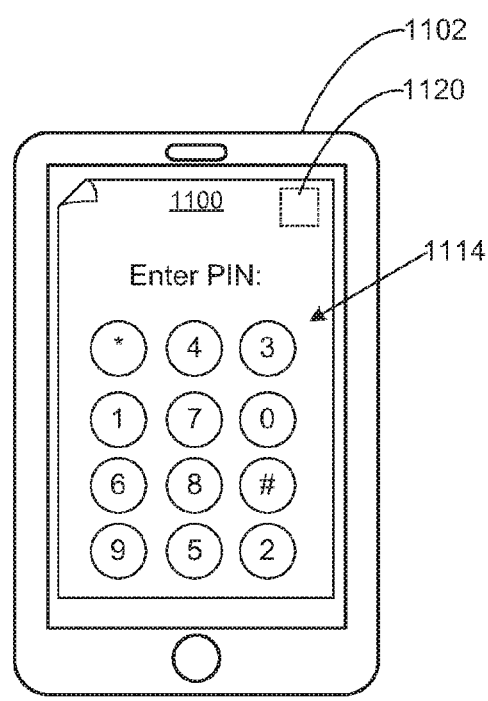
FIG. 11 is a schematic diagram which illustrates an auxiliary input device according to embodiments of the invention which is attached to a mobile device.

FIG. 11 is a schematic diagram which illustrates an auxiliary input device (1100) according to embodiments of the invention which is attached to a mobile device (1102). In the illustrated embodiment, auxiliary input device (1100) is disposed in a touch-sensitive film. The touch-sensitive film is preferably transparent and may be attached to a display screen using the attachment component (for example as one would attach a screen protector to a smart phone). As the auxiliary input device (1100) is transparent, when nothing is being displayed on the output component of the auxiliary input device, the display screen of the mobile device will be visible therethrough.

Embodiments of the invention provide for the auxiliary input device (1100) to have a passive operating mode and an active operating mode. In the passive operating mode, the auxiliary input device (1100) is configured to pass user touch-input through the auxiliary input device (1100) to a touch-sensitive screen of the mobile device (1102) so as to not interfere with ordinary operation of the mobile device.

Embodiments of the invention provide for the HSM (1120) of the auxiliary input device (1100) to receive an authentication request from a requestor device which may cause the auxiliary input device (1100) to switch from the passive operating mode to the active operating mode wherein the auxiliary input device (1100) is operable to receive the user's touch-input. Furthermore, the auxiliary input device (1100) may display information to a user via the display component. In the illustrated embodiment, the displayed information is a scrambled keypad (1114). By scrambling the keypad, malware which may be resident on the mobile device (1102), will not be able to infer the data input by the user. For example, if a conventional keypad layout is used (that is one that is not scrambled), although the auxiliary input device (1100) is receiving the user's touch input, the mobile device (1102) may also be able to receive that same touch-input. Thus, malware may be able to compare different relative locations of the user's touch-input to an expected keypad layout so as to infer the entered data.

Figure 12:
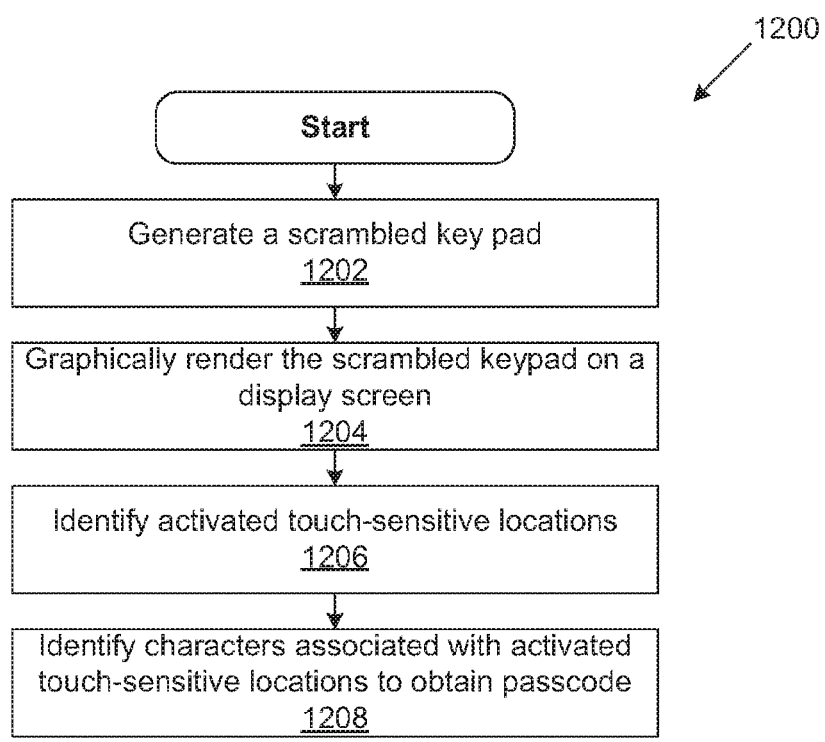
FIG. 12 is a flow diagram which illustrates additional method steps which may be conducted by either a mobile device or an auxiliary input device attached to the mobile device responsive to receiving an authentication request according to embodiments of the invention.

Accordingly, embodiments of the invention provide for the methods for performing passcode authentication as described in the foregoing to include further steps relating to generating a scrambled keypad and receiving a user's input thereon. FIG. 12 is a flow diagram which illustrates such additional steps (1200) which may be conducted by either a mobile device or an auxiliary input device attached to the mobile device responsive to receiving an authentication request from a security gateway at the mobile device. At a first step (1202), the mobile device or auxiliary input device may generate a scrambled keypad and at a next step (1204) graphically render the scrambled keypad on a display screen of either the auxiliary input device or mobile device as the case may be. Characters of the scrambled keypad may be associated with touch-sensitive locations of an input component of the auxiliary input device or mobile device. In a next step (1206), the mobile device or auxiliary input device may identify activated touch-sensitive locations of the input component of the auxiliary input device or mobile device corresponding to user input and in a following step (1208) identify characters associated with the activated touch-sensitive locations so as to obtain the passcode entered by the user.

Embodiments of the invention accordingly provide systems, methods and devices for performing passcode authentication. It is anticipated that systems, methods and devices of the invention may be used in a wide range of applications. For example, a user's authentication may be required in opening a financial account, registering for a new service, authorizing a transaction, logging into a computer or remote server computer, gaining access to a resource or the like. Embodiments of the invention may be implemented in any scenario in which a user may be required to provide a passcode for "what I know" or "something I know" authentication. For example, instead of providing the passcode, to a requestor device for checking or comparing against an offset thereat, an identifier may be provided to the requestor device which can then pass the identifier to a security gateway in an authentication request. The security gateway can then forward the authentication request to an identified mobile device for input and comparing of the passcode thereat. The mobile device can then generate a secure authentication confirmation message if the passcode corresponds to an offset thereof and transmit the authentication confirmation message to the security gateway for onward transmission to the requestor device or a host network.

Embodiments of the invention thus provide systems methods and devices for passcode authentication wherein the user's passcode is not required to be communicated to external systems or devices. Instead the user's passcode may be input directly into an HSM coupled to the user's mobile device and may be verified or authenticated thereat, with a secure authentication confirmation message being communicated to a relevant third party upon successful authentication. communicate his or her passcode outside of a trusted environment. Embodiments of the invention provide for the authentication message to be secure and in some cases digitally signed meaning that the authentication confirmation message may be trusted as having originated from the user's mobile device in response to the user entering the correct passcode.

Thus embodiments of the invention provide for a user to securely, and in some cases remotely, authenticate a request.

Some embodiments of the invention provide that a transaction authorization may be conducted in a secure and remote manner which in some cases may be regarded as a 'card present transaction'. An exemplary card present transaction known to the art involves a 'chip-and-PIN' credit card. A user must be physically present at the merchant to present the credit card and enter a PIN. Such a transaction may be regarded as a 'two-factor authenticated' transaction where the credit card represents 'something the user has' and the PIN represents 'something the user knows'. Such a card present transaction has the advantage of lower interchange fees charged by financial institutions or processing networks as the risk of fraud may in some cases be lower but has the disadvantage in that the user must be physically located at the merchant.

In some cases the prior art provides that a user may transact with a merchant remotely by providing payment credentials readable by the user from the credit card. Such a transaction may be referred to as 'card not present' transactions may carry a higher interchange fee as the risk of fraudulent use of the user's payment credentials is greater.

Embodiments of the present invention provide however the advantage that a similar 'two-factor transaction authentication' may be conducted with the user being remote from the merchant. As the user's authentication is secure, such authentication may be regarded, from the perspective of interchange fees, as a card present transaction and thus may carry lower interchange fees than existing card not present transactions where a user transacts with a merchant remotely.

Figure 13:
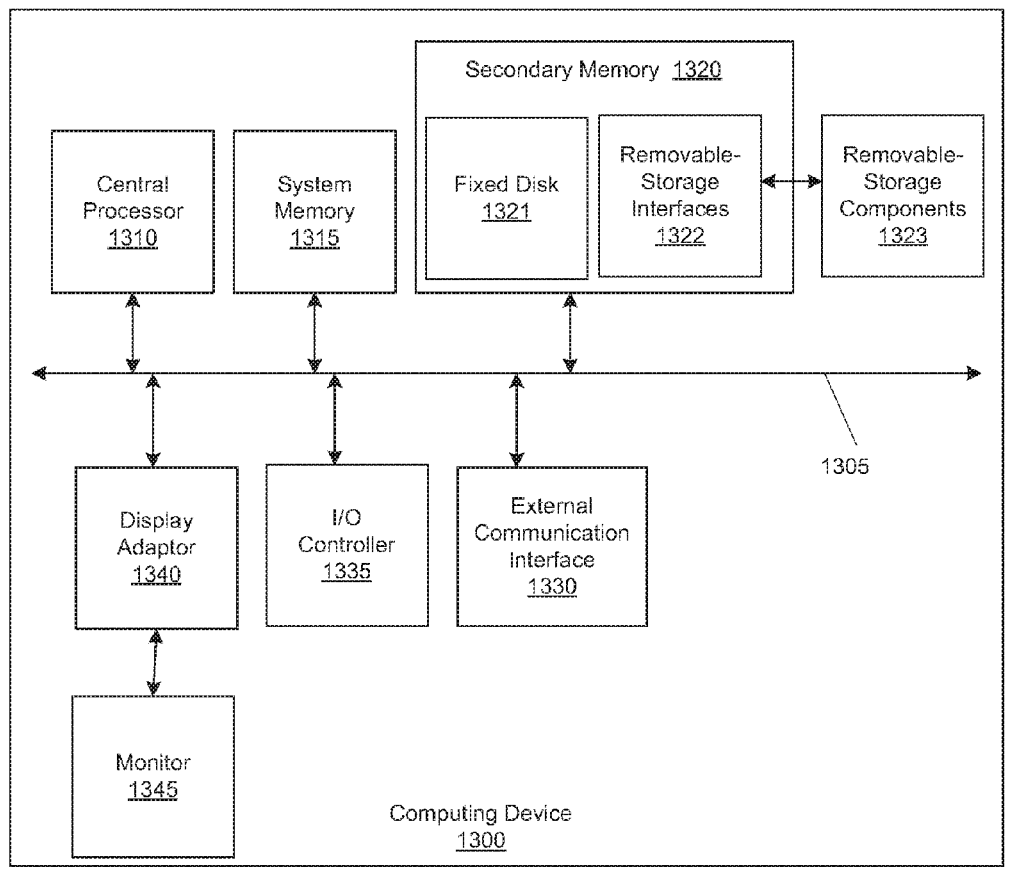
FIG. 13 illustrates an example of a computing device (1300) in which various aspects of the disclosure may be implemented; and, FIG. 14 shows a block diagram of a communication device (1400) that may be used in embodiments of the disclosure.

FIG. 13 illustrates an example of a computing device (1300) in which various aspects of the disclosure may be implemented. The computing device (1300) may be suitable for storing and executing computer program code. The various participants and elements in the previously described system diagrams may use any suitable number of subsystems or components of the computing device (1300) to facilitate the functions described herein.

The computing device (1300) may include subsystems or components interconnected via a communication infrastructure (1305) (for example, a communications bus, a crossover bar device, or a network). The computing device (1300) may include at least one central processor (1310) and at least one memory component in the form of computer-readable media.

The memory components may include system memory (1315), which may include read only memory (ROM) and random access memory (RAM). A basic input/output system (BIOS) may be stored in ROM. System software may be stored in the system memory (1315) including operating system software.

The memory components may also include secondary memory (1320). The secondary memory (1320) may include a fixed disk (1321), such as a hard disk drive, and, optionally, one or more removable-storage interfaces (1322) for removable-storage components (1323).

The removable-storage interfaces (1322) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (1322) may also be in the form of ports or sockets for interfacing with other forms of removable-storage components (1323) such as a flash memory drive, external hard drive, or removable memory chip, etc.

The computing device (1300) may include an external communications interface (1330) for operation of the computing device (1300) in a networked environment enabling transfer of data between multiple computing devices (1300). Data transferred via the external communications interface (1330) may be in the form of signals, which may be electronic, electromagnetic, optical, radio, or other types of signal.

The external communications interface (1330) may enable communication of data between the computing device (1300) and other computing devices including servers and external storage facilities. Web services may be accessible by the computing device (1300) via the communications interface (1330).

The external communications interface (1330) may also enable other forms of communication to and from the computing device (1300) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (1310).

A computer program product may be provided by a non-transient computer-readable medium, or may be provided via a signal or other transient means via the communications interface (1330).

Interconnection via the communication infrastructure (1305) allows a central processor (1310) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (1300) either directly or via an I/O controller (1335). These components may be connected to the computing device (1300) by any number of means known in the art, such as a serial port.

One or more monitors (1345) may be coupled via a display or video adapter (1340) to the computing device (1300).

Figure 14:
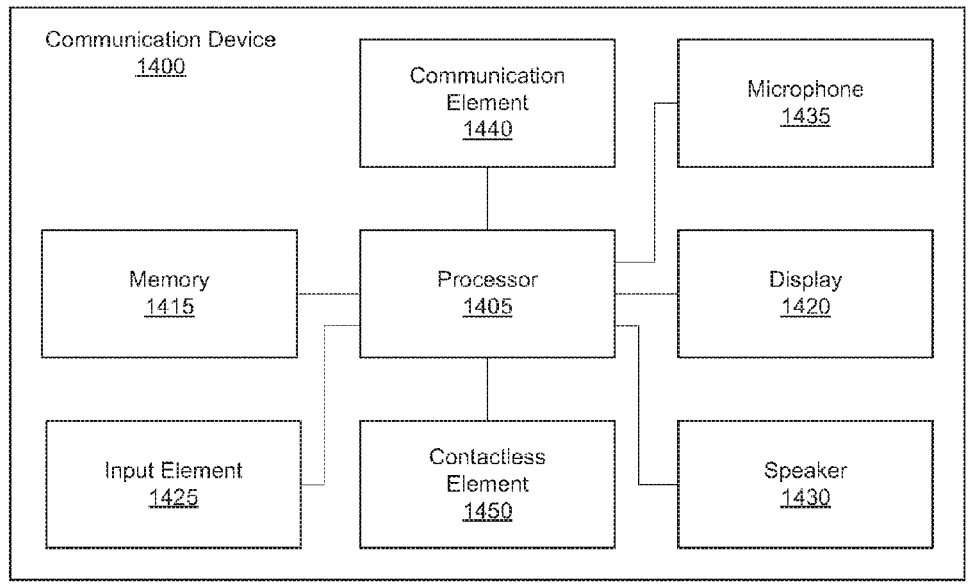

FIG. 14 shows a block diagram of a communication device (1400) that may be used in embodiments of the disclosure. The communication device (1400) may be a cell phone, a feature phone, a smart phone, a satellite phone, or a computing device having a phone capability.

The communication device (1400) may include a processor (1405) (e.g., a microprocessor) for processing the functions of the communication device (1400) and a display (1420) to allow a user to see the phone numbers and other information and messages. The communication device (1400) may further include an input element (1425) to allow a user to input information into the device (e.g., input buttons, touch screen, etc.), a speaker (1430) to allow the user to hear voice communication, music, etc., and a microphone (1435) to allow the user to transmit his or her voice through the communication device (1400).

The processor (1410) of the communication device (1400) may connect to a memory (1415). The memory (1415) may be in the form of a computer-readable medium that stores data and, optionally, computer-executable instructions.

The communication device (1400) may also include a communication element (1440) for connection to communication channels (e.g., a cellular telephone network, data transmission network, Wi-Fi network, satellite-phone network, Internet network, Satellite Internet Network, etc.). The communication element (1440) may include an associated wireless transfer element, such as an antenna.

The communication element (1440) may include a subscriber identity module (SIM) in the form of an integrated circuit that stores an international mobile subscriber identity and the related key used to identify and authenticate a subscriber using the communication device (1400). One or more subscriber identity modules may be removable from the communication device (1400) or embedded in the communication device (1400).

The communication device (1400) may further include a contactless element (1450), which is typically implemented in the form of a semiconductor chip (or other data storage element) with an associated wireless transfer element, such as an antenna. The contactless element (1450) may be associated with (e.g., embedded within) the communication device (1400) and data or control instructions transmitted via a cellular network may be applied to the contactless element (1450) by means of a contactless element interface (not shown). The contactless element interface may function to permit the exchange of data and/or control instructions between mobile device circuitry (and hence the cellular network) and the contactless element (1450).

The contactless element (1450) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (1400) and an interrogation device. Thus, the communication device (1400) may be capable of communicating and transferring data and/or control instructions via both a cellular network and near field communications capability.

The data stored in the memory (1415) may include: operation data relating to the operation of the communication device (1400), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (1400) to selected receivers.

The communication device (1400) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of performing passcode authentication, the method being conducted at a mobile device and comprising the steps of:
   receiving, by the mobile device, an authentication request from a security gateway;
   receiving, by the mobile device, a passcode entered by a user of the mobile device;
   comparing the entered passcode to a passcode offset securely stored in a hardware security module (HSM) within or attached to the mobile device, the HSM comprising a processor having a cryptographic arithmetic logic unit that is optimized for performing cryptographic functions and a secure storage for passcode offsets;
   if the entered passcode corresponds with the passcode offset, generating, by the HSM, a secure authentication confirmation message and transmitting the confirmation message to the security gateway; and,
   if the entered passcode does not correspond with the passcode offset, generating, by the HSM, a secure authentication denial message and transmitting the authentication denial message to the security gateway,
   wherein the steps of generating a secure authentication confirmation message or a secure authentication denial message include digitally signing the secure authentication confirmation message or secure authentication denial message,
   wherein the method includes a step of establishing encrypted communication between the mobile device and the security gateway to transmit the secure authentication confirmation message or secure authentication denial message.

2. The method as claimed in claim 1, wherein the request includes an identifier usable by the security gateway in identifying a mobile device from which authentication is requested, wherein the identifier is associated with a communication address of the mobile device in a database of the security gateway, and wherein the identifier is provided by the user to a requestor device.

3. The method as claimed in claim 1, wherein the step of comparing the entered passcode to a passcode offset securely stored in the HSM coupled to the mobile device is performed by the HSM.

4. The method as claimed in claim 1, wherein the method includes a step of prompting the user of the mobile device to enter the passcode.

5. The method as claimed in claim 1, wherein the step of comparing the entered passcode to the passcode offset includes steps of:
   hashing the entered passcode using a predetermined hash algorithm; and,
   comparing the hashed entered passcode to the passcode offset securely stored in the HSM coupled to the mobile device.

6. The method as claimed in claim 1, wherein the mobile device has an auxiliary input device attached thereto and in communication therewith and in which the HSM is disposed, and wherein the step of receiving a passcode entered by the user of the mobile device includes receiving the passcode entered by the user into an input component of the auxiliary input device.

7. The method as claimed in claim 1, wherein, responsive to receiving an authentication request from the security gateway, the method includes the steps of:
  generating a scrambled keypad;
  graphically rendering the scrambled keypad on a display screen of an auxiliary input device or the mobile device, with characters of the scrambled keypad being associated with touch-sensitive locations of an input component of the auxiliary input device or the mobile device;
  identifying activated touch-sensitive locations of the input component of the auxiliary input device or the mobile device corresponding to user input; and,
  identifying characters associated with the activated touch-sensitive locations so as to obtain a passcode entered by the user.

8. A method of performing passcode authentication, the method being conducted at a security gateway and comprising the steps of:
  receiving an authentication request from a requestor device, the authentication request including an identifier usable in identifying a mobile device from which authentication is requested;
  forwarding the authentication request to the mobile device, the mobile device having a hardware security module (HSM) attached to the mobile device or being within the mobile device, the HSM comprising a processor having a cryptographic arithmetic logic unit that is optimized for performing cryptographic functions and a secure storage for passcode offsets;
  receiving a secure authentication confirmation message or a secure authentication denial message from the mobile device, wherein the authentication confirmation message or authentication denial message is generated locally at the mobile device responsive to comparing an entered passcode with a passcode offset stored in the secure storage of the HSM, and wherein the secure authentication confirmation message or the secure authentication denial message are digitally signed by the HSM,
  wherein the method includes a step of establishing encrypted communication between the mobile device and the security gateway to receive the secure authentication confirmation message or secure authentication denial message.

9. The method as claimed in claim 8, wherein the identifier is provided by a user to the requestor device.

10. The method as claimed in claim 8, wherein the identifier is associated with a communication address of the mobile device in a database of the security gateway and wherein the step of forwarding the authentication request to the mobile device includes a step of using the identifier included in the authentication request to obtain the communication address of the mobile device.

11. The method as claimed in claim 8, wherein the method includes a step of transmitting the authentication confirmation message or authentication denial message to one or both of the requestor device and a payment processing network.

12. A system for performing passcode authentication, the system comprising a mobile device having:
  a request receiving component for receiving an authentication request from a security gateway;
  a passcode receiving component for receiving a passcode entered by a user of the mobile device;
  a comparing component for comparing the entered passcode to a passcode offset securely stored in a hardware security module (HSM) attached to or within the mobile device, the HSM comprising a processor having a cryptographic arithmetic logic unit that is optimized for performing cryptographic functions and a secure storage for passcode offsets; and,
  a generating component for, if the entered passcode corresponds with the passcode offset, generating a secure authentication confirmation message and transmitting the confirmation message to the security gateway and, if the entered passcode does not correspond with the passcode offset, generating a secure authentication denial message and transmitting the authentication denial message to the security gateway, wherein the secure authentication confirmation message or the secure authentication denial message are digitally signed by the HSM,
  wherein communication between the HSM and the security gateway is encrypted so that the authentication confirmation message or authentication denial message transmitted from the mobile device can be verified by the security gateway.

13. The system as claimed in claim 12, wherein the system further includes the security gateway, the secure gateway having:
  a request receiving component for receiving an authentication request from a requestor device, the authentication request including an identifier usable in identifying the mobile device from which authentication is requested;
  a request forwarding component for forwarding the authentication request to the mobile device; and,
  an authentication message receiving component for receiving the secure authentication confirmation message or the secure authentication denial message from the mobile device.

14. The system as claimed in claim 12, wherein the system further includes a requestor device having:
  an identifier receiving component for receiving an identifier; and,
  a request transmitting component for transmitting an authentication request to the security gateway.

15. The system as claimed in claim 14, wherein the requestor device is one or more of: a point-of-sale device; an electronic commerce server computer; and a mobile device of a merchant, and wherein the authentication request is a transaction authorization request.

16. The system as claimed in claim 12, wherein the HSM is disposed in a cryptographic expansion device that attaches to a communication component of the mobile device, wherein the HSM is in electrical communication with the mobile device, wherein the HSM securely stores the passcode offset in a digital memory thereof, and wherein the passcode offset is written to the digital memory of the HSM during manufacture or prior to distribution of the HSM.

17. The system as claimed in claim 12, wherein the offset of the passcode is a hash of the passcode, wherein the hash of the passcode is obtained from a cryptographic hash algorithm and wherein the cryptographic hash algorithm is a secure hash algorithm (SHA).

18. The system as claimed in claim 12, wherein the passcode is one or more of the group of: a personal identification number (PIN); a password; a token; and a key.

19. The system as claimed in claim 12, wherein the mobile device has an auxiliary input device attached thereto and in communication therewith and in which the HSM is disposed, and wherein receiving a passcode entered by the user of the mobile device includes receiving the passcode entered by the user into an input component of the auxiliary input device.

20. The system as claimed in claim 19, wherein the auxiliary input device is a touch-sensitive film configured for attachment to a mobile device.

21. The system as claimed in claim 12, wherein the mobile device or an auxiliary input device attached to the mobile device is further configured to:
   generate a scrambled keypad;
   graphically render the scrambled keypad on a display screen of the auxiliary input device or the mobile device, with characters of the scrambled keypad being associated with touch-sensitive locations of an input component of the auxiliary input device or the mobile device;
   identify activated touch-sensitive locations of the input component of the auxiliary input device or the mobile device corresponding to user input; and,
   identify characters associated with the activated touch-sensitive locations so as to obtain a passcode entered by the user.

22. A cryptographic expansion device for performing passcode authentication, the cryptographic expansion device comprising:
   a first set of electrical contacts disposed on a top side of the cryptographic expansion device configured to interface with a mobile device;
   a second set of electrical contacts disposed on a bottom side of the cryptographic expansion device configured to interface with a communication component;
   a coupling element configured to attach the cryptographic expansion device to the communication component; and
   a hardware security module (HSM) disposed in the cryptographic expansion device and coupled to the first and second sets of electrical contacts, the HSM including a secure processing unit and a public processing unit, and wherein the HSM is configured to:
   receive a passcode entered by a user;
   compare the entered passcode to a passcode offset securely stored in the HSM;
   if the entered passcode corresponds with the passcode offset, generate and digitally sign a secure authentication confirmation message and transmit the confirmation message to a security gateway; and
   if the entered passcode does not correspond with the offset, generate and digitally sign a secure authentication denial message and transmit the denial message to the security gateway
   wherein communication between the HSM and the security gateway is encrypted so that the authentication confirmation message or authentication denial message transmitted from the mobile device can be verified by the security gateway.

23. The cryptographic expansion device as claimed in claim 22, wherein the cryptographic expansion device is a label, and wherein the communication component is a subscriber identity module (SIM) card.

24. The cryptographic expansion device as claimed in claim 22, wherein the offset of the passcode is written to a digital memory of the HSM during manufacture.

25. A non-transitory computer program product for performing passcode authentication, the computer program product comprising a computer-readable medium having stored computer-readable program code for performing the steps of:
   receiving, by a mobile device, an authentication request from a security gateway;
   receiving, by the mobile device, a passcode entered by a user of the mobile device;
   comparing, by the mobile device, the entered passcode to a passcode offset securely stored in a hardware security module (HSM) in or attached to the mobile device, the HSM comprising a processor having a cryptographic arithmetic logic unit that is optimized for performing cryptographic functions and a secure storage for passcode offsets;
   if the entered passcode corresponds with the passcode offset, generating, by the HSM, a secure authentication confirmation message, digitally signing the confirmation message, and transmitting the confirmation message to the security gateway; and,
   if the entered passcode does not correspond with the passcode offset, generating, by the HSM, a secure authentication denial message, digitally signing the authentication denial message, and transmitting the authentication denial message to the security gateway,
   wherein communication between the HSM and the security gateway is encrypted so that the authentication confirmation message or authentication denial message transmitted from the mobile device can be verified by the security gateway.

* * * * *